W. DOE.
OIL REFINERY.
No. 174,789. Patented March 14, 1876.
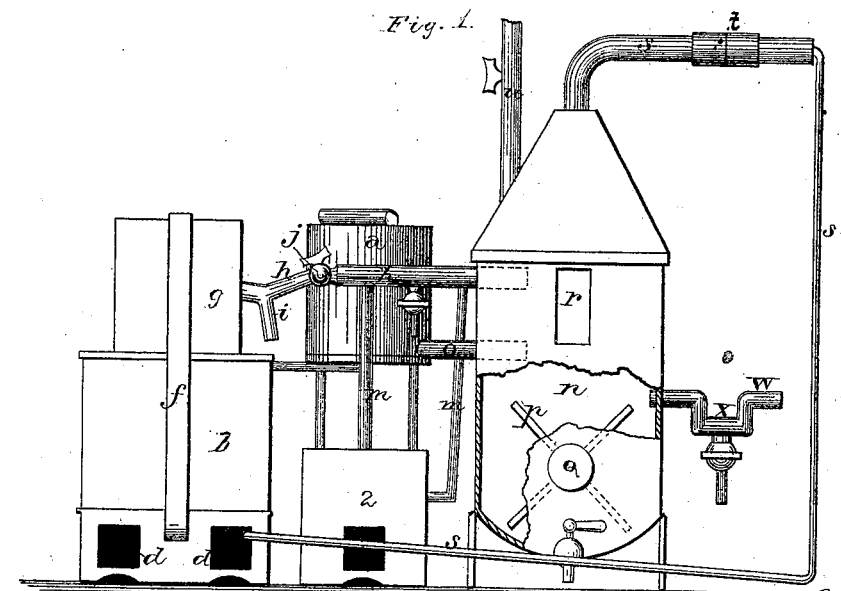
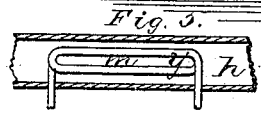
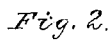
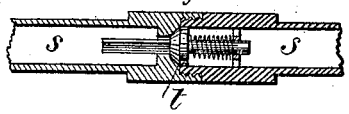
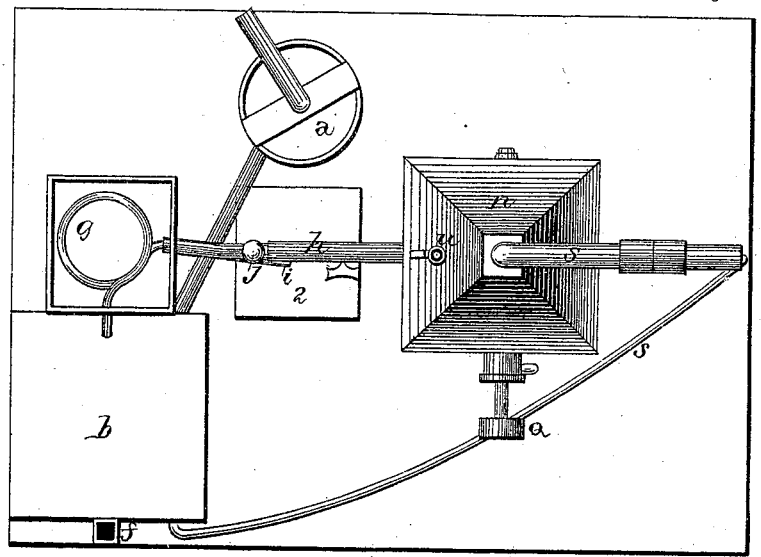
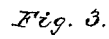
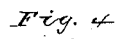
WITNESSES.
Wm. Garner
F. W. Burnham.
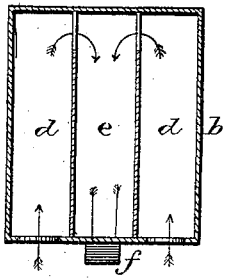
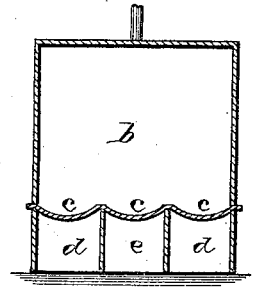
INVENTOR-
Wm. Doe
per
F. A. Lehmann,
Atty.

UNITED STATES PATENT OFFICE.

WILLIAM DOE, OF RENO, PENNSYLVANIA.

IMPROVEMENT IN OIL-REFINERIES.

Specification forming part of Letters Patent No. 174,789, dated March 14, 1876; application filed October 1, 1875.

*To all whom it may concern:*

Be it known that I, WILLIAM DOE, of Reno, in the county of Venango and State of Pennsylvania, have invented certain new and useful Improvements in Oil-Refinery; and I do hereby declare the following to be a full, clear, and exact description of the invention, such as will enable others skilled in the art to which it pertains to make and use it, reference being had to the accompanying drawings, which form part of this specification.

My invention relates to an improvement in refining petroleum and other oils; and it consists in the arrangement and combination of devices that will be more fully described hereinafter, whereby the oil is purified and refined by being treated with chemicals before it is passed into the still, and while it is yet in a crude state passed through a condenser, subjected to heat while being passed to the separator, and then treated by hot air or steam and agitation while in the separator.

By the treatment above described all explosive or inflammable gases are driven off, and a high grade of burning-fluid is produced.

The accompanying drawings represent my invention.

$a$ represents a tank elevated above the top of the still, and in which the crude oil, before it has yet been acted upon, is agitated and treated with chemicals, so as to free the oil of its water and the sediment or deposit that it contains. When the oil is not thus treated before it is passed into the still, the water is converted into steam, which often causes disastrous explosions, and the sediment causes the bottom of the still to burn. From this tank the oil is passed into the still $b$, which has a corrugated bottom, $c$, so as to allow the bottom to expand and contract with the sudden heatings and coolings. The furnace under this still is divided into two separate divisions, $d$, which are separated by the return flue or chamber $e$. This flue connects with both of the furnaces at their rear ends, and then conducts the products of combustion forward to the front end of the still, where they escape up the chimney $f$. From the still the oil passes through the usual condensing-coil $g$, and from thence into the pipe $h$. Leading downward from this pipe is another pipe, $i$, which is kept closed until the pipe $h$ becomes obstructed in some manner, when the distillate will be allowed to flow through this pipe $i$ direct into a receiving-tank, the cock $j$ being turned so as to close the pipe $h$. Just beyond the cock $j$ there is placed in the pipe $h$ a heater, $y$, (shown in Fig. 5,) which consists of a coil of pipes, $m$, which are connected with the heater 2 below, so as to send a current of hot air or steam through them, and thus heat the oil in its passage to the separator. By this application of heat at this point the separation of the oil and gas is assisted, so that when the oil reaches the separator the work of driving off the gas is much more easily accomplished. As the oil passes into the separator it is met by a current of superheated air or steam from the pipe $o$ before it reaches the bottom, so as to atomize and reduce it to spray. After falling to the bottom the oil is kept constantly stirred by a wheel, $p$, the shaft of which passes through the side of the separator, and has a pulley, $q$, on its outer end to receive an operating belt. On opposite sides of the separator there are placed the windows $r$, so that the action of the air or steam may be seen on the oil, and regulated accordingly. The top of the separator is made cone-shaped, and from it leads a pipe, $s$, that conveys away the gas to the furnace, where it is used as fuel in heating the still. In this pipe, at any suitable point, is placed a spring safety-valve, $t$, that serves to prevent the fire from passing into the separator. Leading from the top is also another pipe, $u$, provided with a cock, $v$, so that any excess of gas not needed for fuel can be allowed to escape. Leading from the side of the separator is a pipe, $w$, provided with a trap, $x$, which trap serves to prevent air from entering while the oil is being drawn off.

Having thus described my invention, I claim—

1. The combination of the pipe $h$ and pipe $m$, for heating the oil in its passage to the separator and heater 2, substantially as shown.

2. The combination of still $b$, coil $g$, pipes $h$ $i$ $m$, heater 2, and separator $m$, provided with a stirrer, $p$, substantially as described.

In testimony that I claim the foregoing I have hereunto set my hand this 17th day of September, 1875.

WILLIAM DOE.

Witnesses:
AMOS P. DALE,
DANIEL MCMULLEN.